Jan. 7, 1941.　　　　G. P. HOFMANN　　　　2,227,934
CONTAINER FOR PHARMACEUTICAL PURPOSES
Filed Dec. 21, 1938
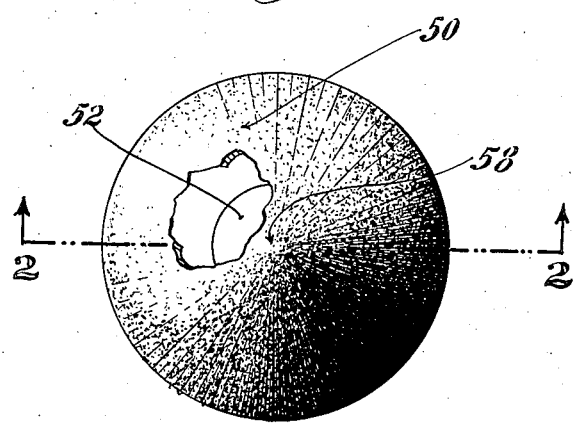
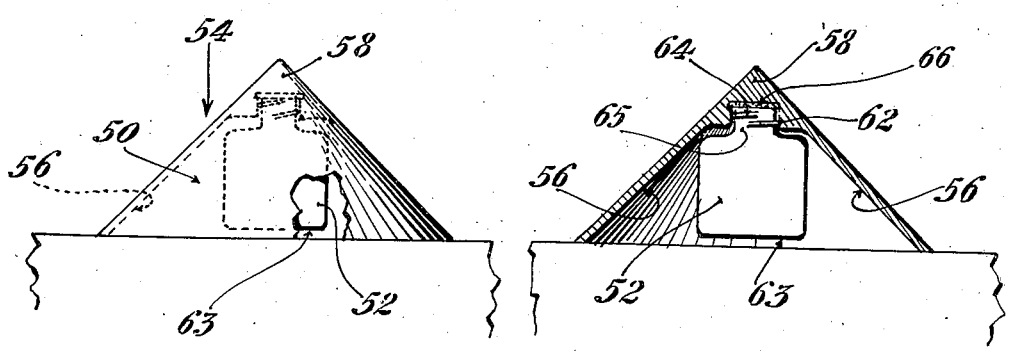
INVENTOR.
Gustav Philip Hofmann
BY
Irving F. Goodfriend
ATTORNEY.

Patented Jan. 7, 1941

2,227,934

UNITED STATES PATENT OFFICE 2,227,934

CONTAINER FOR PHARMACEUTICAL PURPOSES

Gustav Philip Hofmann, New York, N. Y.

Application December 21, 1938, Serial No. 246,974

4 Claims. (Cl. 215—38)

The present invention relates to containers generally and more specifically to a closure member for a container which by virtue of its novel configuration and its structure renders the container peculiarly adaptable to certain uses.

The present invention is in certain respects an improvement and modification of my prior invention described in Patent No. 2,127,918 granted August 23, 1938.

Many deaths occur annually because of the improper use of pharmaceutical preparations, especially those generally classified as "poisons." Indicia on labels affixed to ordinary containers have proved to be inadequate warning and have failed to prevent people from inadvertently or carelessly mistaking a container filled with dangerous ingredients for one filled with harmless medicaments.

To prevent such dangerous and often fatal mistakes, there has been provided, as described in Patent No. 2,127,918, a container of such unique configuration that even in the dark it attracts attention to itself and to its contents. Such container cannot be lifted in the ordinary manner, but must be pushed over the edge of the surface on which it rests and lifted by placing the fingers under the bottom, this latter feature most emphatically directing attention to the contents of the container.

The present invention contemplates the provision of a closure member which may be associated with an ordinary bottle of standard construction and configuration so as to provide advantages such as set forth above. Such closure member, by reason of its peculiar configuration when associated therewith, converts a conventional bottle into the container described in Patent No. 2,127,918. This novel closure member, in addition when operatively associated with a conventional bottle provides a container which is not readily tipped or overthrown being extremely stable when resting on its base.

Furthermore the closure of such a combination cannot be removed from the receptacle until the combined closure and receptacle have been moved over the edge of the surface on which it rests so that the receptacle can be grasped with one hand and the closure removed with the other.

Other valuable features, purposes and uses of the present invention will be apparent from the following description and from the drawing in connection therewith in which Fig. 1 is a front elevation of a closure member embodying my invention arranged on a conventional container and partially broken away to show the container.

Fig. 2 is a cross section taken along the line 2—2 of Fig. 3.

Fig. 3 is a top plan view of the closure member shown in Fig. 1 partially broken away to disclose the container.

Referring now to the drawing a closure member 50 is provided having its external structure so designed that its outer bounding surface 54 is of such shape that it is practically impossible to grasp it with the fingers of either hand and lift it from the shelf or other surface on which it rests and which outer bounding surface because of its peculiar shape therefore serves to warn that the nature of the contents of the container is unusual.

The outer bounding surface 54 of the closure member extends vertically uniformly upwardly and inwardly from the edges of the preferably circular base to the apex thereof and presents a single uninterrupted exterior surface which is preferably in the form of a right circular cone, any vertical cross section of which is substantially parabolic or hyperbolic in form, and which offers no protrusion which may be readily grasped by the hand to lift the container when it is desired to gain access to its contents.

The closure member may be formed from any suitable material, for example of any of the well known plastics, and, in order to obtain the best results, it is preferably smooth. The angle which the outer bounding surface 54 forms with the base or bottom and the angle formed at the apex should be such that the resultant of the forces on the container caused by pressure of the fingers against said outer bounding surface 54 thereof has a downward component of force while the force against the hand is upwardly along the outer bounding surface 54 so as to tend to prevent the separation of the container from the surface upon which it rests. I prefer that the apex angle should be of a magnitude not less than sixty degrees.

The walls 56 of the closure member 50 may be comparatively thin. A thicker portion 58 is formed at the upper end or apex of the closure member 50. This thicker portion is formed of solid material in which an opening 60 has been provided in which portion internal threads 62 are formed adapted to cooperate with the external threads 64 on the neck 65 of any conventional receptacle 52 to secure it completely within the confines of the closure member. A washer or gasket 66 may be provided to fit over the opening of the bottle 52 to more adequately seal the contents of the bottle against leakage.

The size of the aperture 60 may be varied and may be of any standard size to conform to the threads that are usually put on medicinal bottles so that the capping member may be used with any such bottle having a standard size neck. However, the aperture 60 and the threads 62 may be made to fit any bottle of whatever configuration or whatever shape of thread it may have. While I have shown the bottle secured to the cover member by threads, it will readily be understood that it may be secured in a number of ways which will be immediately apparent to any skilled mechanic and which, therefore, will not be described here.

It will be understood that it is preferably desired to extend the outer bounding surface at least to the bottom 63 of the bottle 52.

When it is desired to dispense the contents of the bottle, it is necessary to push the container, consisting of the bottle and the cover member, to the edge of the surface on which it rests before it can be lifted therefrom, and then only by grasping the bottle in one hand and turning the cover member in the other is it possible to gain access to the contents of the bottle.

It is apparent that here is provided a closure member adapted to fit a standard bottle which closure member is so designed to convert any conventional receptacle to form a container which cannot be lifted with one hand but must be handled in a special manner, and which is difficult for a child or mental patient to open, such as that disclosed in Patent No. 2,127,918.

It is further apparent that when a closure member of such configuration is associated with a conventional bottle there is provided a container which is of extremely stable equilibrium, due to the comparatively low centre of gravity of the combination.

It is to be understood that this function of my container is independent of the provision of a smooth outer bounding surface.

It will be apparent that I have provided a closure member for a conventional container that will convert such container to one that cannot be readily grasped by one hand and lifted from the support on which it rests.

Other advantages of my invention will be readily apparent from the foregoing description. Having described my invention in detail, I desire it to be understood that various changes and modifications may be made therein without departing from the inventive concept.

I claim:

1. The combination in a container for pharmaceutical preparations of a closure member having an outer bounding surface extending upwardly and inwardly from the base to an apex, the apex angle of said surface being of such magnitude that the resultant force on the hand effected by grasping the said surface with the hand is upwardly along the surface, with a receptacle member adapted to be associated therewith and arranged within said outer bounding surface.

2. In a container, the combination of a closure member having an outer bounding surface extending upwardly and inwardly from the base to an apex, with a receptacle member adapted to be associated therewith and arranged completely within said outer bounding surface.

3. The combination in a container for pharmaceutical preparations of a closure member having an outer bounding surface extending upwardly and inwardly from the base to an apex, the apex angle of said surface being of such magnitude that the resultant force on the hand effected by grasping the said surface with the hand is upwardly along the surface, with a receptacle member adapted to be associated therewith and arranged within said outer bounding surface, said outer bounding surface being comparatively smooth and unobstructed throughout its extent.

4. In a container, the combination of a closure member having an outer bounding surface extending upwardly and inwardly from the base to an apex, with a receptacle member adapted to be associated therewith, said outer bounding surface extending at least to the base of the receptacle.

GUSTAV PHILIP HOFMANN.